United States Patent [19]

Martin

[11] 4,083,070
[45] Apr. 11, 1978

[54] INFLATABLE LIFERAFTS OF THERMOPLASTIC MATERIAL AND METHODS FOR THEIR MANUFACTURE

[75] Inventor: Michael Dudley Martin, Haslemere, England

[73] Assignee: RFD Inflatables Limited, Godalming, England

[21] Appl. No.: 702,078

[22] Filed: Jul. 2, 1976

[30] Foreign Application Priority Data

Apr. 5, 1976 United Kingdom ............... 13710/76

[51] Int. Cl.² ............................................. B63C 9/04
[52] U.S. Cl. ................................................... 9/11 A
[58] Field of Search ...................... 9/2 A, 11 A, 11 R

[56] References Cited

U.S. PATENT DOCUMENTS 2,456,086   12/1948   Schwall ................................. 9/2 A Primary Examiner—Trygve M. Blix
Assistant Examiner—Stuart M. Goldstein
Attorney, Agent, or Firm—Kenyon & Kenyon, Reilly, Carr & Chapin

[57] ABSTRACT

A method of making an inflatable liferaft from thermoplastic sheet material, wherein the thermoplastic sheet material which is to form a floor of the liferaft is heat welded around the periphery of the floor to the thermoplastic sheet material which is to form a peripheral inflatable buoyancy tube of the liferaft, after which edges of the material which is to form the tube are joined by heat welding to close the tube along its longitudinal extent.

7 Claims, 10 Drawing Figures

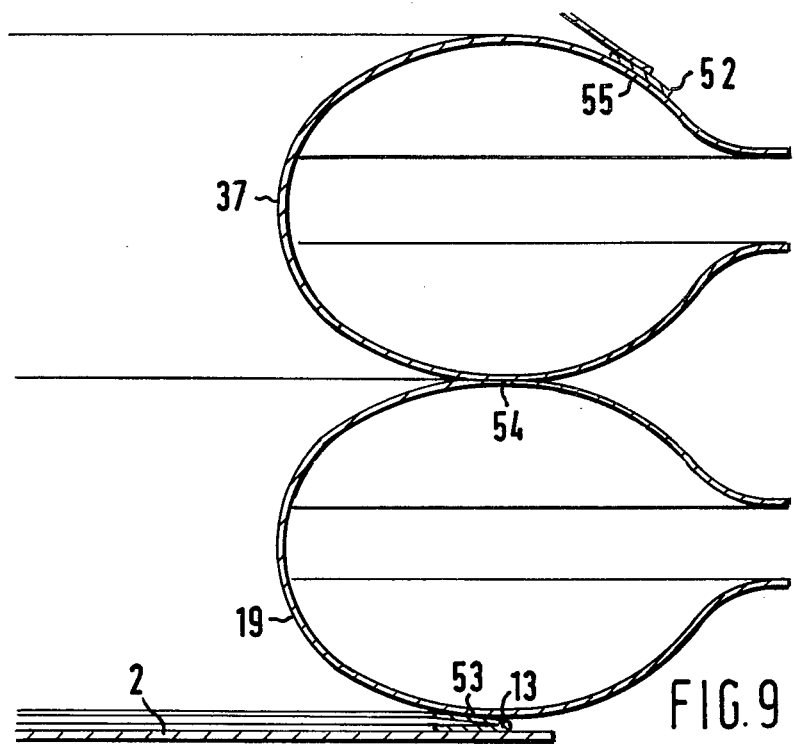
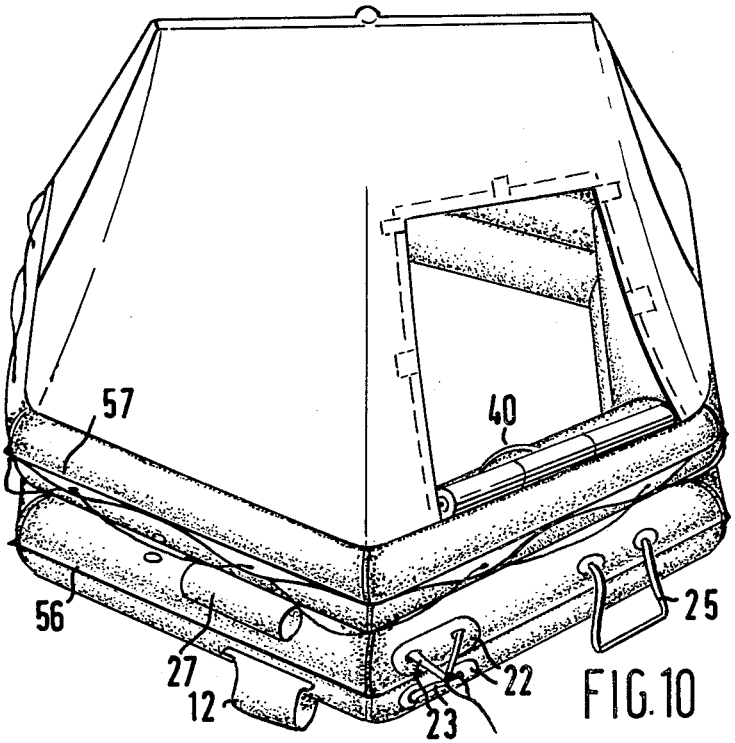

INFLATABLE LIFERAFTS OF THERMOPLASTIC MATERIAL AND METHODS FOR THEIR MANUFACTURE

This invention relates to an improved method of making inflatable liferafts and to liferafts made by such a method.

Hitherto, inflatable liferafts have been made by joining panels of suitable material together by the use of adhesive. Such a method is labour intensive and the present invention aims to provide a method of making inflatable liferafts which is more economical in the use of labour and which takes advantage of modern materials.

According to the invention there is provided a method of making an inflatable liferaft from thermoplastic sheet material, wherein the thermoplastic sheet material which is to form a floor of the liferaft is heat welded around the periphery of the floor to the thermoplastic sheet material which is to form a peripheral inflatable buoyancy tube of the liferaft, after which edges of the material which is to form the tube are joined by heat welding to close the tube along its longitudinal extent.

A liferaft made by a method according to the invention will now be described, by way of example, with reference to the accompanying drawings, in which:

FIG. 9 is a fragmentary sectional view showing the liferaft at an intermediate stage of construction, and FIG. 10 is a perspective view of the completed liferaft.

The liferaft is made almost completely out of a thermoplastic sheet material which in the present embodiment is a nylon textile coated on both sides with polyurethene. The liferaft is made by constructing each of the sub-assemblies of FIGS. 1 to 4 as a separate unit before the four sub-assemblies are attached to one another. The manner of constructing each of the sub-assemblies of FIGS. 1 to 4 will therefore be described first.

Figure 1:
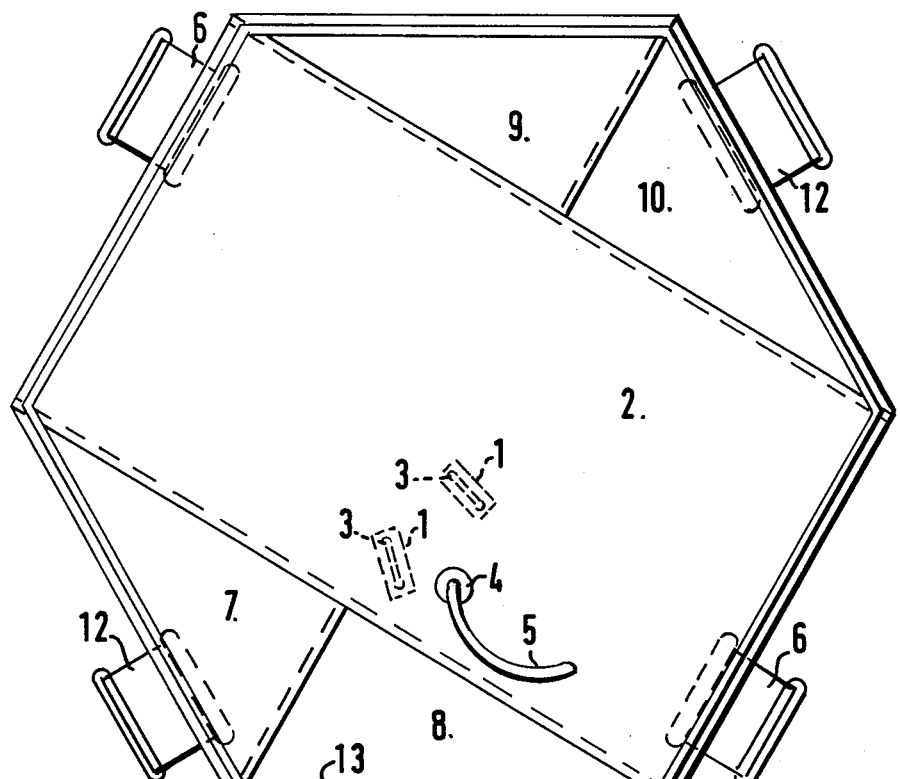
FIG. 1 is a plan view of a floor sub-assembly of the liferaft.

The construction of the floor sub-assembly shown in FIG. 1 is commenced by attaching two base patches 1 to the underside of a rectangular main panel 2. The base patches 1 and the main panel 2 are of the thermoplastic sheet material and attachment is effected by heat welding. Each base patch 1 has two spaced holes and the ends of respective righting handle straps 3 are threaded through the holes in the base patch 1 and heat welded in position between the base patch 1 and the panel 2, in a similar manner to that illustrated in FIG. 8. A circular base patch 4 is heat welded to the upper surface of the main panel 2, a pull strap 5 being inserted into a hole in the base patch 4 and heat welded between the patch 4 and the panel 2, again in the manner indicated in FIG. 8. The pull strap 5 enables a person in the sea to haul himself into the liferaft. The edges of two flaps 6 of the thermoplastic material are heat welded to opposite ends of the main panel 2 on the underside thereof. This completes the work on the main panel 2 of the floor sub-assembly.

The floor sub-assembly includes four triangular panels 7 to 10 which are also made of the thermoplastic material and which are of this stage separate from one another and from the main panel 2. Edges of two further flaps 12 (similar to the flaps 6) are heat welded to the edges of the triangular panels 7 and 10, after which the triangular panels 7 to 10 are attached to the main panel 2 by heat welding along the seams shown in FIG. 1. A strip 13 of material, folded so that it is of V-shape in cross-section as shown in FIG. 9, has its lower fold heat welded around the hexagonal periphery of the floor on the upper surface thereof. The strip 13 is made from material which is similar to that of the panels 2 to 10, except that it is coated with thermoplastic polyurethene on one side only, the facing surfaces of the folded strip 13 being uncoated.

Figure 2:
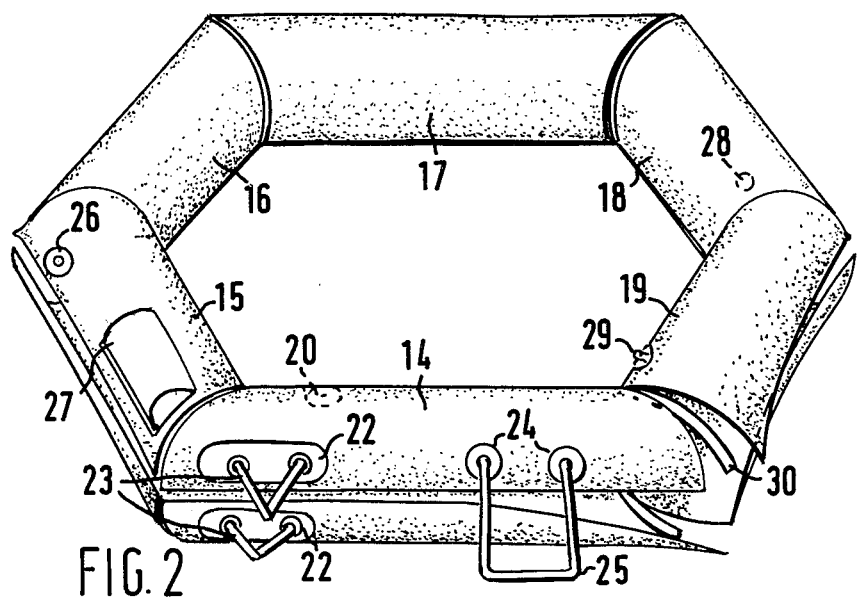
FIG. 2 is a perspective view of a lower buoyancy tube sub-assembly.
Figure 8:
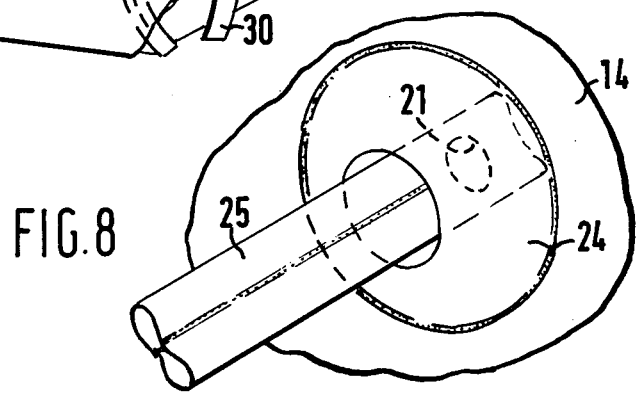

Referring to FIG. 2, the lower buoyancy tube sub-assembly is constructed from six panels 14 to 19 which are made from the thermoplastic material and which are shaped so that they can be folded into tubes to form the six straight sides of the lower buoyancy tube. A thermoplastic base flange 20 of a top-up valve is heat welded to the panel 14. Painter base patches 22 of the thermoplastic material are heat welded to the panel 14 and the ends of painter line straps 23 are welded between these base patches 22 and the panel 14 in the manner indicated in FIG. 8. Circular base patches of the thermoplastic material are welded to the panel 14 and the ends of a boarding ladder strap 25 are heat welded between the base patches 24 and the panel 14, as shown at 21 in FIG. 8. The painter line straps 23 and boarding ladder straps 25 are made by folding strips of the thermoplastic material into a tube and heat welding to form a flat strip, as indicated in FIG. 8.

An inlet valve 26 is secured to the panel 15, this being achieved by the use of an adhesive. A pocket 27 is heat welded to the panel 15, the pocket 27 being intended to receive a cylinder of compressed gas which is used to inflate the liferaft. A flange of a relief valve 28 is heat welded to the panel 18 and the relief valve is assembled to the flange. A patch 29 for the attachment of a rescue line is heat welded to the panel 19. The two remaining panels 16 and 17 which make up the lower buoyancy tube do not have any attachments.

Figure 3:
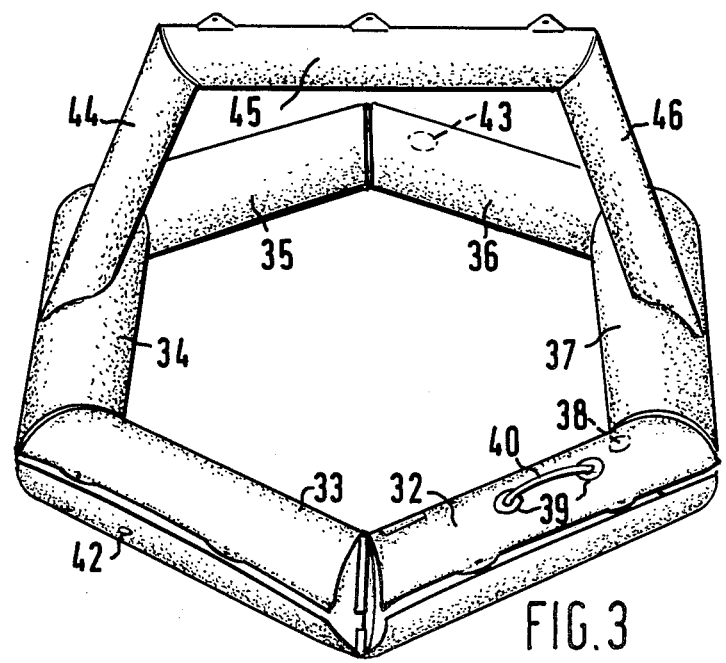
FIG. 3 is a perspective view of an upper buoyancy tube and arch tube sub-assembly.
Figure 7:
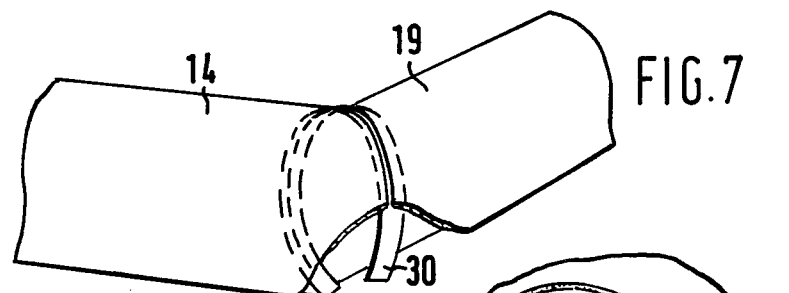

The panels 14 to 19 which are to form the lower buoyancy tube are heat welded end to end in series with the aid of joining strips 30 of thermoplastic material so as to form an endless loop of individual panels which are open (on the outboard side) in the sense that they have not yet been closed to form a tube. The joining of two adjacent panels of the lower buoyancy tube by means of the joining strip 30 is illustrated in FIG. 7 which shows, by way of example, the joining of the two panels 14 and 19. At this stage, the panels 14 to 19 are only joined to one another along the seam lines which are on the inboard side in the completed liferaft, the longitudinal edges of the panels being unattached, in the manner illustrated in FIG. 2. The upper buoyancy tube and arch tube sub-assembly of FIG. 3 is made in the following manner. The upper buoyancy tube is made from six panels 32 to 37 of the thermoplastic material, the panels 32 to 37 being similar in shape to the panels 14 to 19. A top-up valve 38 and boarding handle base patches 39 are heat welded to the panel 32. Ends of a boarding handle strap 40 are inserted in holes in the patches 39 and heat welded between the base patches 39 and the panel 32 in the manner illustrated in FIG. 8. An inlet valve 42 is attached to the panel 33 by the use of adhesive. A relief valve flange 43 is heat welded to the panel 36 and the relief valve (not shown) is attached to the flange 43.

Figure 5:
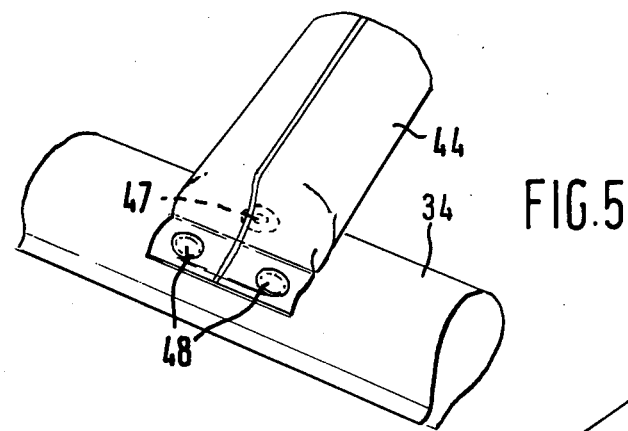
FIGS. 5 to 8 are scrap perspective views illustrating the manner in which various component parts of the liferaft are heat welded together.

Three panels 44, 45 and 46 of the thermoplastic material which are to form the arch tube are heat welded together end to end, the attachment being made by joining strips in a similar manner to that illustrated in FIG. 7. The longitudinal edges of the panels 44, 45 and 46 are heat welded into tubes with the aid of a V strip similar to the strip 51, in the manner illustrated in FIG. 6, but a longitudinal portion at the lower end of each panel 44 and 46 is left unjoined. The ends of the arch tube are secured by respective ring welds 47 (FIG. 5) to the respective panels 34 and 37, before the unsealed portions at the lower ends of the panels 44 and 46 are sealed by heat welding. Further heat welds shown at 48 in FIG. 5 connected the lower ends of the arch tube to the panels 34 and 37.

The six panels 32 to 37 which are to form the upper buoyancy tube are then joined together end to end by heat sealing, adjacent panels being joined with the aid of a strip which overlaps adjacent panels on the inside surface thereof in the manner illustrated in FIG. 7. Longitudinal edges of the panels 32 to 37 are at this stage left unsealed, in an exactly similar manner to that previously described for the lower buoyancy tube.

Figure 4:
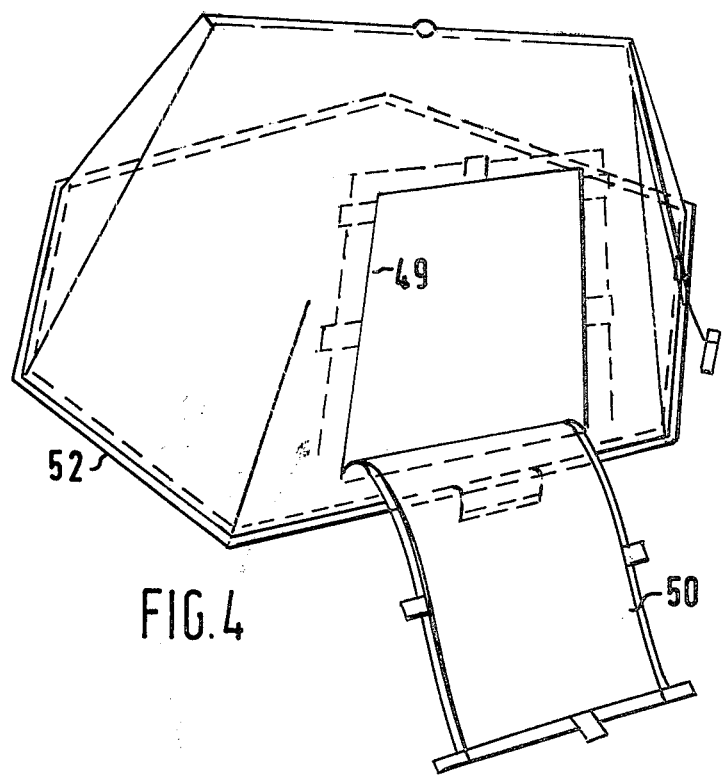
FIG. 4 is a perspective view of a canopy sub-assembly.

The canopy sub-assembly of FIG. 4 comprises fabric panels which are stitched together. One side of the canopy has an aperture 49 which can be closed by means of a flap 50. A strip 52 of the thermoplastic material is stitched to the canopy around the lower edge thereof.

There are now four separate sub-assemblies which are assembled together to form the completed liferaft. Firstly, the hexagonal periphery of the floor sub-assembly is heat welded to the material which is to form the lower buoyancy tube, this being achieved by heat welding the upper fold of the V-shaped strip 13 to the panels 14 to 19 as indicated at 53 in FIG. 9 in the case of the panel 19. The material which is to form the lower buoyancy tube, that is the panels 14 to 19, is then heat welded to the material which is to form the upper buoyancy tube, that is the panels 32 to 37, this weld being shown at 54 in FIG. 9. After these three sub-assemblies have been joined together in this way the canopy sub-assembly is attached by heat welding the edge strip 52 of the canopy to the upper buoyancy tube as illustrated at 55 in FIG. 9. The free edges of the flaps 6 and 12 are heat welded to the lower buoyancy tube so as to form pockets (visible in FIG. 10) which may accommodate water bottles.

Figure 6:
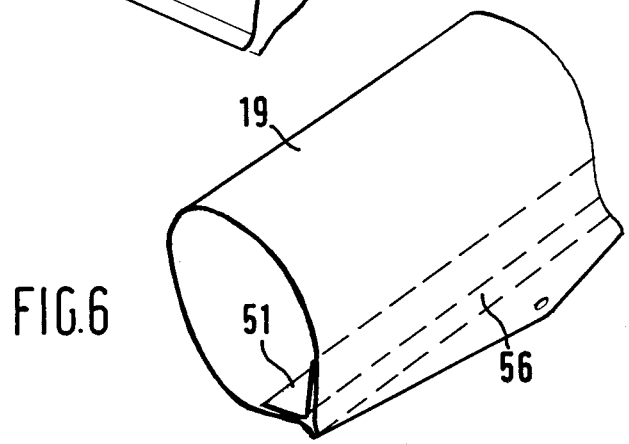

Subsequently, the edges of the material which is to form the lower buoyancy tube are brought together and heat welded together to form a seam 56 extending around the outboard side of the liferaft, this seam being reinforced by a V-shaped strip 51 welded on the internal side of the tube, as illustrated in FIG. 6 in the case of the panel 19. The strip 51 is similar to the strip 13 in that it is made from material which is coated with polyurethene on one side only. The edges of the material which is to form the upper buoyancy tube are similarly brought together and heat welded together in a peripheral seam 57 extending around the outboard side of the liferaft. The seam 57 is reinforced with a V-shaped strip similar to that shown at 51 in FIG. 6. The canopy is then tied to the arch tube and the complete liferaft is rigged and fitted.

The two peripheral buoyancy tubes are not in communication but are arranged to be inflated simultaneously (through the valves 26 and 42) from the cylinder of inflated gas accommodated within the pocket 27. The upper buoyancy tube is in communication with the arch tube.

I claim:
1. A method of making an inflatable polygonally shaped liferaft comprising the steps of fabricating a polygonally shaped liferaft floor from flexible thermoplastic sheet material, fabricating a buoyancy tube sub-assembly by joining a plurality of panels of flexible thermoplastic sheet material in series at the transverse edges of adjacent panels in lipless, non-overlapping, end-to-end, abutting relationship by heat welding adjoining strips of thermoplastic material disposed contiguous with the portions of the surfaces of the adjacent panels proximate to the transverse edges thereof and which are to be at the interior of the buoyancy tube sub-assembly, the strips overlapping the transverse edges of adjacent panels, whereby the panels are joined to form an endless loop, there being a single panel for each side of the polygonal shape of the liferaft, positioning the buoyancy tube sub-assembly with one of the longitudinal edges of each of the panels disposed outwardly of the floor periphery and with a portion of each panel adjacent the one of the longitudinal edges overlying the periphery of the floor, inserting a V-shaped strip of material consisting of thermoplastic material only on the outer surfaces of the strip, the V-shaped strip being inserted between the portion of each panel adjacent to the one of the longitudinal edges and the periphery of the floor, the apex of the V-shaped strip extending outwardly with respect to the periphery of the floor, heat welding the upper surface of the periphery of the floor to the lower outer surface of each of the V-shaped strips and heat welding of outer surface of the portion of each of the panels of the buoyancy tube sub-assembly adjacent the one longitudinal edge thereof to the upper outer surface of each of the V-shaped strips, the inner surface of each of the V-shaped strips remaining free of one another after the heat welding to enable each V-shaped strip to be hinged about the apex thereof, thereby creating a heat welded seam between the floor periphery and the buoyancy tube sub-assembly, positioning the other longitudinal edge of each of the panels in an overlying relationship with the one longitudinal edge of each of the panels, inserting a V-shaped strip of material consisting of thermoplastic material only on the outer surfaces of the strip between the portions of the inner surfaces of each panel adjacent the one and other longitudinal edges thereof, the apex of each V-shaped strip extending toward the longitudinal edges of each panel, the inner surfaces of each panel immediately adjacent the longitudinal edges thereof being contiguous to one another, heat welding the inner surfaces of each panel immediately adjacent the longitudinal edges thereof to one another and heat welding the inner surface of each panel to the outer surfaces of the V-shaped strip disposed therebetween, the inner surfaces of each V-shaped strip being free of one another after the heat welding to enable the V-shaped strip to be hinged about the apex thereof, the heat welding of the panels adjacent the longitudinal edges closing the buoyancy tube sub-assembly along its longitudinal extent and forming a single, uninterrupted, longitudinally-extending heat welded seam about the buoyancy tube sub-assembly, said single seam extending around the outboard side of the liferaft, whereby seams on the inboard side of the buoyancy tube sub-assembly used to fabricate the buoyancy tube sub-assembly consist only of lipless, heat welded transverse seams.

2. The method of claim 1, and further comprising the steps of:

fabricating an upper buoyancy tube sub-assembly by joining a plurality of panels of flexible thermoplastic sheet material in series at the transverse edges of adjacent panels in lipless, non-overlapping, end-to-end, abutting relationship by heat welding adjoining strips of thermoplastic material disposed contiguous with the portions of the surfaces of the adjacent panels proximate to the transverse edges thereof and which are to be at the interior of the buoyancy tube sub-assembly, the strips overlapping the transverse edges of adjacent panels, whereby the panels are joined to form an endless loop, there being a single panel for each side of the polygonal shape of the liferaft, positioning the upper buoyancy tube sub-assembly adjacent the buoyancy tube sub-assembly to be heat welded to the floor, the upper buoyancy tube sub-assembly being positioned with the outer surface thereof adjacent one of the longitudinal edges thereof in engagement with the upper outer surface of the buoyancy tube sub-assembly to be heat welded to the floor, heat welding the upper buoyancy tube assembly to the buoyancy tube sub-assembly to be welded to the floor at the region of engagement therebetween, inserting a V-shaped strip of material consisting of thermoplastic material only on the outer surfaces of the strip between the portions of the inner surfaces of each panel of the upper buoyancy tube sub-assembly adjacent the longitudinal edges thereof, the apex of each V-shaped strip extending toward the longitudinal edges of each panel, the inner surfaces of each panel of the upper buoyancy tube sub-assembly immediately adjacent the longitudinal edges thereof being contiguous to one another, heat welding the inner surface of each panel of the upper buoyancy tube sub-assembly immediately adjacent the longitudinal edges thereof to one another and heat welding the inner surface of each panel of the upper buoyancy tube sub-assembly to the outer surfaces of the V-shaped strip disposed therebetween, the inner surfaces of each V-shaped strip being free of one another after the heat welding to enable the V-shaped strip to be hinged about the apex thereof, the heat welding of the panels of the upper buoyancy tube sub-assembly adjacent the longitudinal edges closing the upper buoyancy tube sub-assembly along its longitudinal extent and forming a single, uninterrupted, longitudinally-extending heat welded seam about the upper buoyancy tube sub-assembly, said single seam extending around the outboard side of the liferaft, whereby seams on the inboard side of the upper buoyancy tube sub-assembly used to fabricate the upper buoyancy tube sub-assembly consist only of lipless, heat welded transverse seams.

3. The method of claim 1 wherein the sub-step of fabricating the upper buoyancy sub-assembly, further includes the step of heat welding an arch tube of flexible thermoplastic material to mutually opposite sides of the upper buoyancy sub-assembly.

4. The method of claim 3 wherein the sub-step of heat welding an arch tube to the upper buoyancy sub-assembly comprises the further sub-steps of:

heat welding a plurality of arch tube panels of thermoplastic material end-to-end at the transverse edges of adjacent panels by means of adjoining strips, thereby leaving only two unjoined ends, heat welding all the longitudinal edges of the arch tube panels except for end unjoined longitudinal edge portions at the two unjoined ends, ring welding the two unjoined ends to the mutually opposite sides of the upper buoyancy sub-assembly, and heat welding the end unjoined longitudinal edge portions of the arch tube panels.

5. An inflatable liferaft comprising, a polygonally shaped liferaft floor made from flexible thermoplastic sheet material.

A buoyancy tube sub-assembly having a plurality of panels of flexible thermoplastic sheet material disposed in series at the transverse edges of adjacent panels in lipless, non-overlapping, end-to-end, abutting relationship, and adjoining strips of thermoplastic material being disposed contiguous with the portions of the surfaces of the adjacent panels proximate to the transverse edges thereof and which are to be at the interior of the buoyancy tube sub-assembly, the strips overlapping the transverse edges of adjacent panels, the strips being heat welded to the adjacent panel, whereby the panels are joined to form an endless loop, there being a single panel for each side of the polygonal shape of the liferaft, the buoyancy tube sub-assembly being disposed with one of the longitudinal edges of each of the panels extending outwardly of the floor periphery and with a portion of each panel adjacent the one of the longitudinal edges overlying the periphery of the floor, a V-shaped strip of material consisting of thermoplastic material only on the outer surfaces of the strip, the V-shaped strip being disposed between the portion of each panel adjacent to the one of the longitudinal edges and the periphery of the floor, the apex of the V-shaped strip extending outwardly with respect to the periphery of the floor, the upper surface of the periphery of the floor being heat welded to the lower outer surface of each of the V-shaped strips, the outer surface of the portion of each of the panels of the buoyancy tube sub-assembly adjacent the one longitudinal edge thereof being heat welded to the upper outer surface of the V-shaped strips, the inner surfaces of each of the V-shaped strips remaining free of one another after the heat welding to enable each V-shaped strip to be hinged about the apex thereof, thereby creating a heat welded seam between the floor periphery and the buoyancy tube sub-assembly, the other longitudinal edge of each of the panels being disposed in an overlying relationship with the one longitudinal edge of each of the panels, a V-shaped strip of material consisting of thermoplastic material only on the outer surfaces of the strip being disposed between the portions of the inner surfaces of each panel adjacent the longitudinal edges thereof, the apex of each V-shaped strip extending toward the longitudinal edges of each panel, the inner surfaces of each panel immediately adjacent the longitudinal edges thereof being contiguous to one another, the inner surfaces of each panel immediately adjacent the longitudinal edges thereof being heat welded to one another, the inner surface of each panel being heat welded to the outer surfaces of the V-shaped strip disposed therebetween, the inner surfaces of each V-shaped strip being free of one another after the heat welding to enable the V-shaped strip to be hinged about the apex thereof, the heat welding of the panels adjacent the longitudinal edges closing the buoyancy tube sub-assembly along its longitudinal extend and forming a single, uninterrupted, longitudinally-extending heat welded seam about the buoyancy tube sub-assembly, said single seam extending around the outboard side of the liferaft; whereby seams on the inboard side of the buoyancy tube sub-assembly used to form the endless loop consist only of lipless, heat welded transverse seams.

6. An inflatable liferaft according to claim 5 and further comprising; an upper buoyancy tube sub-assembly having a plurality of panels of flexible thermoplastic sheet material disposed in series with the transverse edges of adjacent panels being lipless and in a non-overlapping, end-to-end, abutting relationship, and adjoining strips of thermoplastic material disposed contiguous with the portions of the surfaces of the adjacent panels proximate to the transverse edges thereof and which are to be at the interior of the upper buoyancy tube sub-assembly, the strips overlapping the transverse edges of adjacent panels and being heat welded to the panels, whereby the panels are joined to form an endless loop, there being a single panel for each side of the polygonal shape of the liferaft, the upper buoyancy tube sub-assembly being disposed adjacent the buoyancy tube sub-assembly heat welded to the floor, the upper buoyancy tube sub-assembly being disposed with the outer surface thereof adjacent one of the longitudinal edges thereof in engagement with the upper outer surface of the buoyancy tube sub-assembly heat welded to the floor, the upper buoyancy tube sub-assembly being heat welded to the buoyancy tube sub-assembly welded to the floor at the region of engagement therebetween, and a V-shaped strip of material consisting of thermoplastic material only on the outer surfaces of the strip being disposed between the portions of the inner surfaces of each panel of the upper buoyancy tube sub-assembly adjacent the longitudinal edges thereof, the apex of each V-shaped strip extending toward the longitudinal edges of each panel, the inner surfaces of each panel of the upper buoyancy tube sub-assembly immediately adjacent the longitudinal edges thereof being contiguous to one another, the inner surface of each panel of the upper buoyancy tube sub-assembly immediately adjacent the longitudinal edges thereof being heat welded to one another and the inner surface of each panel of the upper buoyancy tube sub-assembly being heat welded to the outer surfaces of the V-shaped strip disposed therebetween, the inner surfaces of each V-shaped strip being free of one another to enable the V-shaped strip to be hinged about the apex thereof, the heat welding of the panels of the upper buoyancy tube sub-assembly adjacent the longitudinal edges closing the upper buoyancy tube sub-assembly along its longitudinal extent and forming a single, uninterrupted, longitudinally-extending heat welded seam about the upper buoyancy tube sub-assembly, said single seam extending around the outboard side of the liferaft, whereby seams on the inboard side of the upper buoyancy tube sub-assembly used to form the endless loop consist only of lipless, heat welded transverse seams.

7. An inflatable liferaft according to claim 6 and further comprising an arch tube of flexible thermoplastic material heat welded to mutually opposite sides of the upper buoyancy tube sub-assembly.

* * * * *

UNITED STATES PATENT AND TRADEMARK OFFICE
CERTIFICATE OF CORRECTION

PATENT NO. : 4,083,070

DATED : April 11, 1978

INVENTOR(S) : Michael Dudley Martin

It is certified that error appears in the above-identified patent and that said Letters Patent are hereby corrected as shown below:

```
Col. 2, line 7
     delete "of"   insert -- at --

Col. 3, line 21
     delete "connected"   insert -- connect --

Col. 4, line 44
     delete "of"   insert -- the --

Col. 8, line 36
     delete ","   insert -- ; --
```

Signed and Sealed this

Third Day of October 1978

[SEAL]

Attest:

RUTH C. MASON
Attesting Officer

DONALD W. BANNER
Commissioner of Patents and Trademarks